(12) United States Patent
Granger et al.

(10) Patent No.: US 7,426,480 B2
(45) Date of Patent: Sep. 16, 2008

(54) IN-VEHICLE PROMOTIONS SYSTEM

(75) Inventors: Daniel D. Granger, Tarpon Springs, FL (US); Eric N. Williams, Tampa, FL (US)

(73) Assignee: Catalina Marketing Corporation, St. Petersburg, FL (US)

( * ) Notice: Subject to any disclaimer, the term of this patent is extended or adjusted under 35 U.S.C. 154(b) by 506 days.

(21) Appl. No.: 09/373,625

(22) Filed: Aug. 13, 1999

(65) Prior Publication Data

US 2002/0007306 A1    Jan. 17, 2002

Related U.S. Application Data

(60) Provisional application No. 60/138,500, filed on Jun. 9, 1999.

(51) Int. Cl.
*G06Q 30/00* (2006.01)

(52) U.S. Cl. .................. 705/14; 705/26; 705/27; 340/988; 340/990; 340/995; 340/691.6; 455/414; 455/4.1

(58) Field of Classification Search ............... 705/26, 705/14, 27; 340/691.6, 988, 990, 995; 455/414, 455/4.1, 4.2; 701/200, 201, 206, 213
See application file for complete search history.

(56) References Cited

U.S. PATENT DOCUMENTS

| | | | |
|---|---|---|---|
| 4,973,952 A | 11/1990 | Malec et al. | |
| 5,072,380 A | 12/1991 | Randelman et al. | |
| 5,128,752 A | 7/1992 | Von Kohorn | |
| 5,249,044 A | 9/1993 | Von Kohorn | |
| 5,250,789 A | 10/1993 | Johnsen | |
| 5,287,266 A | 2/1994 | Malec et al. | |
| 5,295,064 A | 3/1994 | Malec et al. | |
| 5,305,197 A | 4/1994 | Axler et al. | |
| 5,327,066 A | 7/1994 | Smith | |
| 5,351,187 A | 9/1994 | Hassett | |

(Continued)

FOREIGN PATENT DOCUMENTS

DE     196 39 546     4/1998

(Continued)

OTHER PUBLICATIONS

Jan. 15, 2001, PCT Written Opinion PCT/US99/24746.

(Continued)

*Primary Examiner*—Nga Nguyen
(74) *Attorney, Agent, or Firm*—Neifeld IP Law, PC

(57) ABSTRACT

An in-vehicle promotions system and a method for distributing promotions information. A system is installed in a vehicle able to display promotions information from stores or other businesses subscribing to the system. When the vehicle is driven within a certain proximity of the store, the promotions information, which may include coupons, is automatically displayed. The system may also include a printer for printing the promotions or other information either on demand or automatically. The position of the vehicle may be monitored with a GPS or Loran receiver and the promotions information displayed when the system finds the position of the vehicle to be within a defined range of a store with which the promotions information is associated. The store may also transmit the coupon information which is received by the in-vehicle system when the vehicle comes within a defined transmitting range of the store.

66 Claims, 5 Drawing Sheets

U.S. PATENT DOCUMENTS

| | | | |
|---|---|---|---|
| 5,401,946 A | 3/1995 | Weinblatt | |
| 5,406,271 A | 4/1995 | Sonnendorfer et al. | |
| 5,420,606 A | 5/1995 | Begum et al. | |
| 5,422,624 A | 6/1995 | Smith | |
| 5,465,085 A | 11/1995 | Caldwell et al. | |
| 5,499,181 A | 3/1996 | Smith | |
| 5,515,270 A | 5/1996 | Weinblatt | |
| 5,614,898 A * | 3/1997 | Kamiya et al. | 340/995 |
| 5,617,319 A * | 4/1997 | Arakawa et al. | 340/995 |
| 5,627,549 A * | 5/1997 | Park | 340/988 |
| 5,640,002 A | 6/1997 | Ruppert et al. | |
| 5,697,061 A | 12/1997 | Krueger et al. | |
| 5,717,374 A | 2/1998 | Smith | |
| 5,726,431 A | 3/1998 | VanDonkelaar et al. | |
| 5,729,697 A | 3/1998 | Schkolnick et al. | |
| 5,742,229 A | 4/1998 | Smith | |
| 5,761,648 A | 6/1998 | Golden et al. | |
| 5,767,795 A * | 6/1998 | Schaphorst | 340/998 |
| 5,773,954 A | 6/1998 | VanHorn | |
| 5,774,870 A | 6/1998 | Storey | |
| 5,794,116 A * | 8/1998 | Matsuda et al. | 725/114 |
| 5,806,018 A | 9/1998 | Smith et al. | |
| 5,806,045 A | 9/1998 | Biorge et al. | |
| 5,819,234 A | 10/1998 | Slavin et al. | |
| 5,821,512 A | 10/1998 | O'Hagan et al. | |
| 5,821,513 A | 10/1998 | O'Hagan et al. | |
| 5,835,061 A * | 11/1998 | Stewart | 342/457 |
| 5,845,263 A * | 12/1998 | Camaisa et al. | 705/27 |
| 5,850,187 A | 12/1998 | Carrender et al. | |
| 5,857,175 A * | 1/1999 | Day et al. | 705/14 |
| 5,859,414 A | 1/1999 | Grimes et al. | |
| 5,867,780 A * | 2/1999 | Malackowski et al. | 455/414 |
| 5,870,716 A | 2/1999 | Sugiyama et al. | |
| 5,880,449 A | 3/1999 | Teicher et al. | |
| 5,969,968 A * | 10/1999 | Pentel | 705/26 |
| 5,979,757 A * | 11/1999 | Tracy et al. | 235/383 |
| 5,999,934 A * | 12/1999 | Cohen et al. | 707/100 |
| 6,060,993 A * | 5/2000 | Cohen | 340/691.6 |
| 6,108,533 A * | 8/2000 | Brohoff | 455/414 |
| 6,452,498 B2 * | 9/2002 | Stewart | 340/573.1 |

FOREIGN PATENT DOCUMENTS

| | | |
|---|---|---|
| DE | 196 39 546 A1 | 4/1998 |
| JP | 9-244566 | 9/1997 |
| JP | 2000-292182 | 10/2000 |
| WO | WO 96/11436 | 4/1996 |
| WO | WO 98/38589 | 9/1998 |

OTHER PUBLICATIONS

Feb. 22, 2000, International Search Report PCT/US99/24746.

* cited by examiner

IN-VEHICLE PROMOTIONS SYSTEM

This application claims priority of provisional application Ser. No. 60/138,500 Filed Jun. 9, 1999 which is incorporated herein by reference.

BACKGROUND OF THE INVENTION

1. Field of the Invention

The present invention is related to an in-vehicle promotions system, and in particular to an in-vehicle promotions system for displaying advertising, including discount coupon information, and the optional printing of the displayed advertising or coupons.

2. Discussion of the Background

Many manufacturers and business establishments distribute discount coupons or advertisements offering discounted or sale prices on items through merchandising such as direct mailing of advertising brochures or catalogs, printing advertisements or coupons in newspapers and magazines or, recently, through the Internet. A customer will collect the coupon and present it at the time of purchase to receive a discount, or will bring the advertisement offering the discounted prices. The retail store will redeem the coupon, which is typically bar coded for reading by an optical scanner, or the computer system of the store will already be programmed with the discounted item price.

These methods of marketing to the consumer have a disadvantage that the customer may not in fact know of the coupon or of the item being offered at a discounted price. Unless the customer is inclined to patronize a business establishment or had a reason to visit the business establishment, the marketing is ineffective. The marketing is ineffective from another standpoint, as a common goal in a marketing campaign is to increase the number of customers who buy a particular product or to add new customers. The people who are inclined to visit the business establishment are not new customers. Also, a customer who collects such coupons may belong to a narrow group and also may not be new customers.

With the advent of electronic and digital communication, new ways are being explored to reach existing and potential customers. Such ways often try to employ intelligent systems which automatically perform such tasks as searching for information and then supplying it to a user or potential customer so that he or she can browse the information at his or her leisure. An example of such a system is the personalized Internet newspapers which automatically search for articles based upon a profile prepared by the subscriber. The Internet newspaper then at some interval, usually daily, prepares a personalized newspaper accessible at the subscriber's leisure.

Another concern of a marketing campaign is to reach people at times when their work or personal obligations do not otherwise command their attention. Such approaches are exemplified by television monitors in airport waiting areas, monitors in commuter train cars, etc. What is needed is a system which can provide information in the way of advertising, coupons, etc. at a time which is convenient for a person in an intelligent manner.

SUMMARY OF THE INVENTION

It is an object of the present invention to provide an in-vehicle promotions system where a person can receive promotions information, which is information concerning promotional benefits offered to the customer, such as notification of a business' services and or products, sale, advertising discount or coupon information, in their vehicle automatically.

It is another object of the invention to provide an in-vehicle promotions system where promotions information is distributed based upon the vehicle coming into proximity to a business establishment or other business location with which the promotions information is associated.

It is a further object of the invention to provide an in-vehicle promotions systems adaptable to be used with existing navigation and display instruments.

It is still another object of the invention to allow a person, while in their vehicle, to optionally print coupon information of a business establishment either in proximity to the vehicle or selected by the occupants of the vehicle.

It is another object of this invention to provide an in-vehicle promotion system which will automatically credit promotional benefits to persons passing a business establishment through the communication to the business establishment of personal identification information, that is stored in the in-vehicle system, which identifies the customer to the business establishment.

It is a still further object of the invention to provide a method of displaying promotions information in the vehicle where the promotions information is displayed after the vehicle comes within a defined proximity to a business establishment with which the promotions information is associated.

It is yet another object of the invention to allow retailers and manufacturers to reach customers when they might not otherwise be reached, at a time and place when the customer or potential customer is inclined to visit a business establishment or the retailer or manufacturer and make a purchase.

These and other objects of the invention are achieved by an in-vehicle promotions system having a position receiver, and a controller, a wireless communications device, a display adapted to be installed in the vehicle, and an optional printer, each connected to the controller. The receiver may be a Loran or GPS-based receiver and the wireless communications system may be either a radio modem or a cellular modem, or a paging system.

The controller may be connected to a memory storing a lookup table linking a position of the vehicle with a storage location of promotions information. The promotions information may be stored in the memory connected to the controller, or may be stored in a memory in a host system wirelessly linked to the in-vehicle system. The system may also include a means for storing information linking a zone proximate to the business establishment with the promotions information associated with the business establishment.

The display may have touch command areas for controlling the display and optional printing of the displayed promotions information. The promotions information displayed may include coupon information, and such displays may have a means for activating printing of the coupon information.

The receiver may output a position of the vehicle, and the controller may have a means for retrieving promotions information based upon the position of the vehicle. The controller may also retrieve the promotions information associated with a zone proximate to the business establishment with which the promotions information is associated, based upon the vehicle entering the zone.

The system may also include a host system wirelessly linked to the in-vehicle system, preferably to the wireless communications device. The host system may include a second controller, and a second wireless communications device and promotions information storage device connected to the second controller. The receiver in the in-vehicle system may output a position of the vehicle to the controller of the in-vehicle system, and the controller may comprise means for retrieving promotions information from the host system based upon this position. A memory may be connected to the controller storing information linking a position of the vehicle and a storage location of corresponding promotions information, and the controller may comprise means for automatically retrieving from the host system updated information linking the position and location of corresponding promotions information.

The in-vehicle promotion system may notify the business establishment or host system of the vehicle's proximity to a business establishment, thereby allowing the business establishment to automatically provide promotional benefits to the customer. The store may have an account for customers with in-vehicle systems, and the in-vehicle system will have identification data which identifies a person or persons associated with the vehicle to the business establishment. The notification provided to the business establishment will include this identification, allowing the business establishment to reflect the promotional benefits in the account corresponding to the person associated with the vehicle.

In a second embodiment of the invention, the in-vehicle promotions system may include a RF receiver receiving transmitted promotions information, a controller connected to the receiver, and a display adapted to be installed in the vehicle and a printer, both connected to the controller.

The second embodiment may also include a host system having a second controller and an RF transmitter for transmitting the promotions information to the RF receiver in the in-vehicle system. The host system may also include a promotions information storage device connected to the second controller. The RF transmitter may be located in the business establishment, and the RF transmitter has a transmitting range proximate to the business establishment. The RF receiver receives the promotion information when the vehicle is in the range of the RF transmitter.

The second embodiment may also include an RF transmitter in the vehicle to notify business establishments when the vehicle is in the business establishment's proximity. This RF transmitter would transmit personal identification information to allow the business establishment to provide automatic promotional benefits to the person or persons identified as associated with the vehicle.

These and other objects are also achieved by a method of displaying promotions information in the vehicle including the steps of storing data corresponding to the promotions information in the vehicle, and displaying the data after the vehicle becomes within a defined proximity to a business establishment with which the promotions information is associated. A method may also include the steps of storing data linking a position of the vehicle with promotions information, monitoring the position of the vehicle and displaying the data corresponding to the promotions information using the data linking the position and the promotions information after the position of the vehicle is within the defined proximity to the business establishment. A method may also include printing the data in the vehicle, and printing coupon information when the data includes coupon information.

The promotions data may also be transmitted from the business establishment and received in the vehicle. The promotions information may be stored in the vehicle for a predetermined period of time and the data may be updated with data transmitted from a host system. The updating may be performed automatically.

The objects of the invention may also be achieved with a method of distributing promotions information including the steps of forming a database of promotions information of at least one business establishment, wirelessly distributing data corresponding to the promotions information to a vehicle, and displaying the data when the vehicle is within a defined area of the business establishment. The data may be displayed only after the vehicle comes within the defined range. The method may also include printing data corresponding to the promotions information, printing coupons when the data is coupon data and notifying the business establishment of the identity or persons associated with the vehicle when the vehicle is in the proximity of the business establishment.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
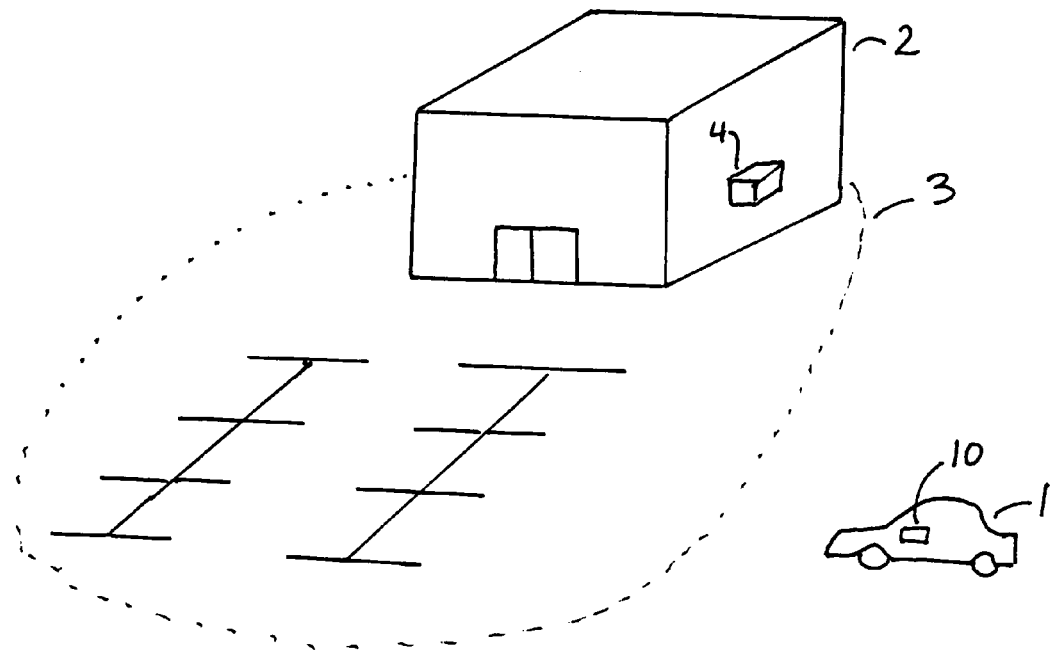
FIG. 1 is an overall view of the system and method according to the invention.

Referring now to the drawings, and in particular to FIG. 1 illustrating an overall operation of the system and method according to the invention. An in-vehicle display system 10 is installed in a vehicle 1. The vehicle travels in the proximity of a retail store 2. Retail store 2 could be a stand-alone store or be a shopping center containing a number of merchants, such as a mall or shopping strip, other retail outlet, or business establishment. The description below will use the term "store" to refer to any or all of such businesses. Shown in dashed lines around store 2 is a proximity zone 3 defining an area assigned to the store (or a group of stores in the case of a shopping center). When vehicle 1 enters zone 3, system 10 displays sale, advertising, discount or coupon information ("promotions information") of the stores or stores corresponding with zone 3. Proximity zone 3 may be defined by a radial range centered on store 2, such as 100 m, or could be a defined area such as a parking lot or area bounded by nearby streets. Thus, when the vehicle enters the parking lot of a retail store, any available information relating to that store would be available for display and/or printing by the occupant or occupants of the vehicle. The proximity of other stores could also be factored into the size and shape of zone 3.

Store 2 may have a store system 4 performing various operations in connection with sales and promotions of products. Store system 4 is shown in block form in FIG. 2A. The system 4 has a controller 6, a communications port 5 and a database 7. Communications port 5 may include a wireless communication device, such as a cellular or radio modem or paging transceiver. Database 7 may contain a frequent shopper database allowing promotions to be targeted to frequent customers, as described in more detail below, and/or a database of promotional information to be disseminated to customers. System 4 may be part of a point-of-sale system used for the sale of products.

Figure 3:
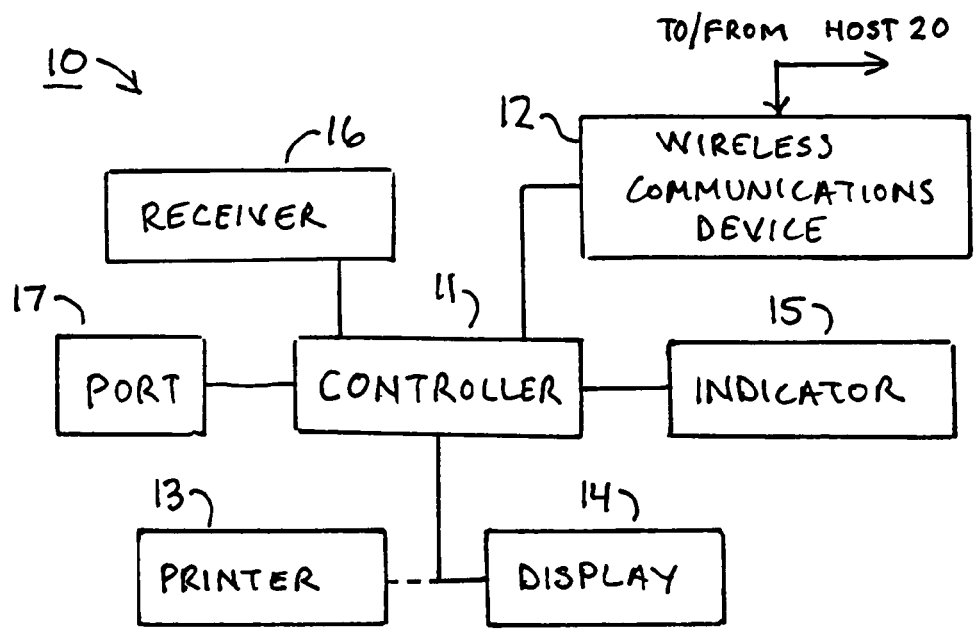
FIG. 3 is a simplified block diagram showing a first embodiment of an in-vehicle promotions device according to the invention.

FIG. 3 shows a first embodiment of the information display system 10 according to the invention. Such a system is designed to be installed in an automotive vehicle and preferably cooperate with existing electronics. The system of FIG. 3 includes a controller 11 that may include a processor for carrying out data processing, memory accessing and retrieval, and memory management. Connected to controller 11 is a wireless remote communication device 12. Device 12 allows wireless communication between the system and a remote host system, which will be described in more detail below.

The wireless remote communication device 12 may be a wireless modem such as a cellular modem or a radio modem. Such modems are manufactured by companies such as Motorola. Systems exist now, such as the ARDIS (semiconductor) wireless network capable of functioning with the Motorola radio modems discussed above, which charges based on usage. Alternatively, a cellular modem could dial a toll free number connecting to host system 20. The wireless communication system may also be a paging system. In this case the in-vehicle system can page host 20 to send and receive information.

In the preferred embodiment, a printer 13 is also connected to controller 11. The invention may also be practiced in embodiments without a printer, but only a display. Printer 13 could be a small thermal printer for printing out coupons or other promotions information. The coupons and other promotions information may also be displayed on display 14. Display 14 could be a touch screen having touch command areas which allow printing of the coupon or advertising information using printer 13. Display 14 may be of the kind currently installed in vehicles and used to display vehicle operation information, driving maps, etc. System 10 may also include an indicator 15 to alert a driver or passenger of the vehicle of the receipt of promotions information, more promotions information is waiting for display, the system is activated or remote communication is taking place. Some of the functions of indicator 15 may be performed on display 14 in the form of the touch command areas.

Figure 7:
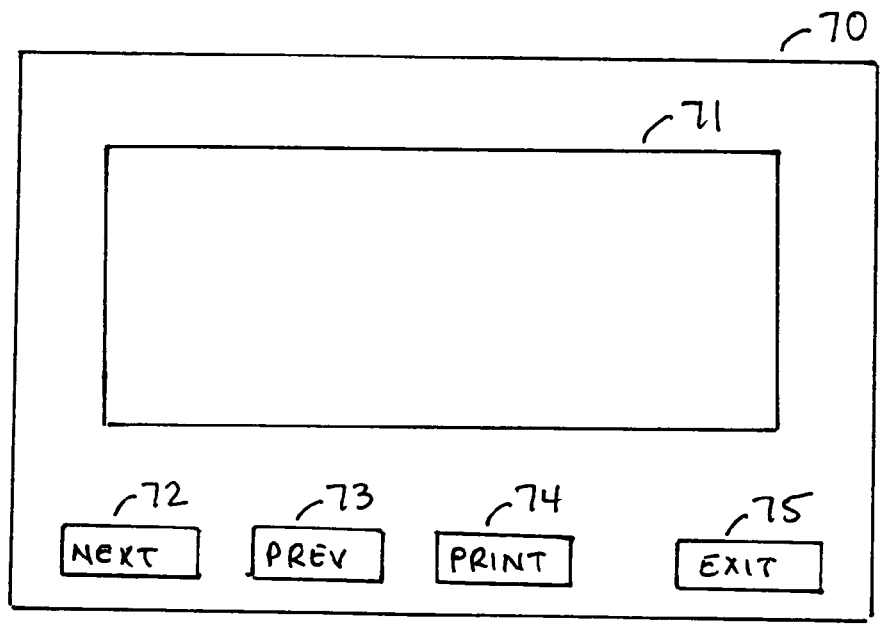
FIG. 7 is a diagram of a display according to the invention.

An example of promotions information is shown in FIG. 7. Screen 70 contains promotions display area 71 where the advertising, sale, discount or coupon information is displayed. Area 71 displays the details of the promotion, the effective dates of the promotion, etc. At the bottom of screen 70 are touch command areas 72-75 to execute functions on the promotions information. An area such as 72 both indicating additional information is to be displayed and allowing access to the next screen of information may be included. A previous screen command 73, print command 74 and exit 75 (or return to vehicle operation or driving directions display) may also be included. The areas may be different for different screens. For example, the display may include an area indicating that system 10 is communicating with host system 20, or memory updating (described below) is taking place.

In the case of closely positioned retail stores, overlapping ranges 3 could occur. In this case multiple information could be displayed for different stores, preferably in the different screens where the user could scroll through the screens using the command areas on the touch display 14.

Indicator 15 may be a light on the instrument panel near the display used in a similar fashion alerting the occupants of the vehicle to operations such as those described above for display 14.

The system also includes a receiver 16 for producing vehicle location information used by the processor to determine the information to be displayed and a data port 17. The system may also receive information identifying, or which can be used to identify, store 2 via device 12. The processor 11 then links the identifying information with the promotions information, displaying it on display 14. The processor could also alert the occupant(s) of the vehicle using indicator 15 or on display 14 to the presence of the promotions information, allowing the occupant(s) to display or print the information as desired, and to switch between the promotions display and, for example, the vehicle operation display. Port 17 allows access to system 10 to store or modify system parameters, and for diagnosis and any needed maintenance. Port 17 may also include an optical or magnetic disk drive to allow information to be input to or output from system 10 using optical or magnetic disks.

Figure 2A:
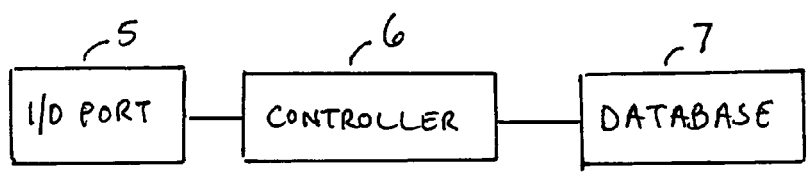
FIG. 2A is a block diagram of a store system according to the invention.
Figure 2B:
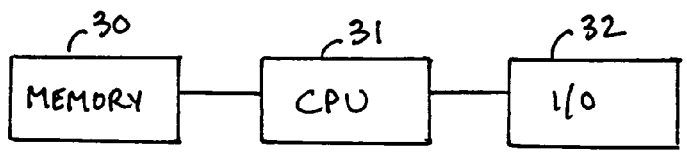
FIG. 2B is a simplified block diagram of the processor shown in the system of FIG. 1.

As shown in FIG. 2B, controller 11 may be configured as a CPU 31 connected to memory 30 and I/O circuitry 32. Memory 30 represents both internal memory and external (to the CPU) memory, with the internal memory containing the code being executed by CPU and possibly other frequently used information while the external memory is typically of higher capacity and stores other information such as additional code executed by the CPU and a determined amount of promotions information. The external memory may be implemented as one or more of a semiconductor memory, a magnetic or an optical memory.

Figure 5A:
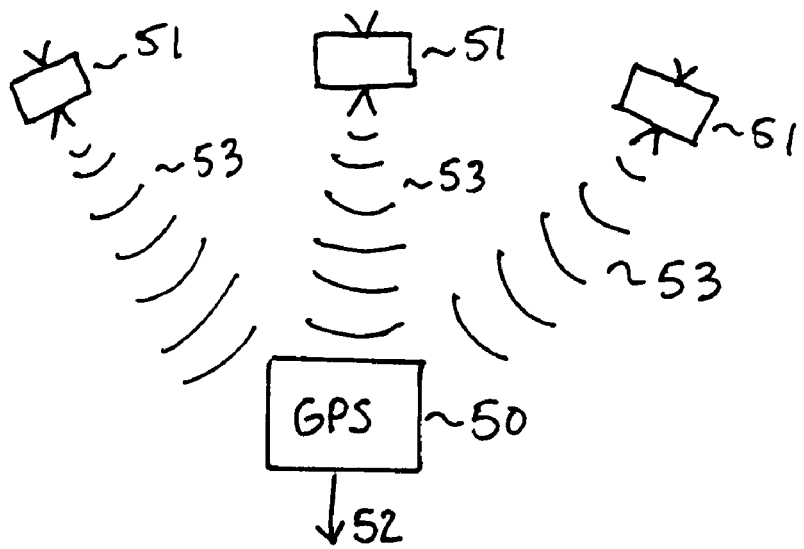
FIG. 5A is a block diagram of a GPS-based in-vehicle system.

In a first example of the system according to the invention shown in FIG. 5A, receiver 16 is a GPS-based receiver 50 receiving signals 53 from GPS satellites 51 and outputting an approximate position 52 of the vehicle. The position information is utilized by controller 11 to determine whether information is to be displayed. For example, the position information from GPS-receiver 16 is used by controller 11 to display information based upon proximity of the vehicle to store 2, i.e., when vehicle 1 enters zone 3.

Figure 5B:
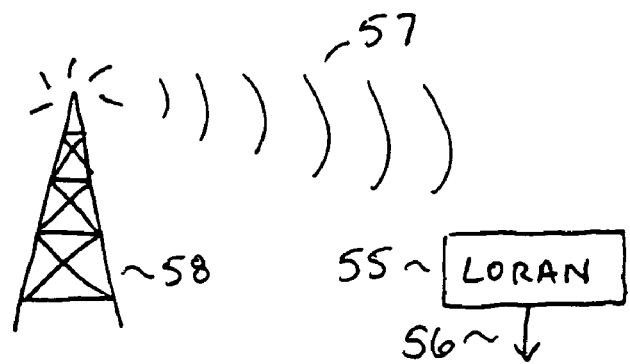
FIG. 5B is a block diagram of a Loran-based in-vehicle system.

Alternatively, as shown in FIG. 5B, receiver 16 may be a Loran-based receiver 55 producing location information 56, produced by, for example, Megapulse, Inc. Receiver 55 receives signals 57 from antenna(s) 58 to produce location information.

Information relating the vehicle position and store 2 may be stored in memory 30, such as in a lookup table. Controller 11 receiving the position information produced from receiver 16 can compare the position information with data stored in the lookup table. The lookup table may be prepared by the manufacturer of the system and loaded into the system before installation into vehicle 2. The lookup table may also be updated with data received over the wireless communications device 12, or periodically through port 17 from an external device, or through a disk drive if included in port 17. Periodic updates through devices connected to port 17 or through port 17 may be accomplished through shipment of a CD ROM or other bulk data carrying devices.

Figure 6A:
FIGS. 6A-6D are diagrams of data formats used in the invention.
Figure 6B:
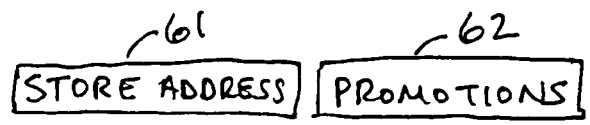
Figure 6C:
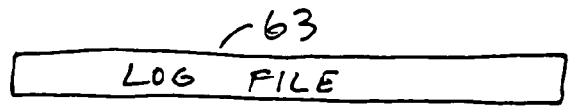

The data may have the form shown in FIG. 6A where memory locations contain a position value or a position range value 60 and store address information 61 indicating a memory address of the promotions information corresponding with that store (or stores). If any matches are found, i.e., the position matches or the received position is in one of the stored position ranges, the processor uses the store address 61 to link with and retrieve display information 62 (FIG. 6B) stored in memory 31, or uses the wireless remote communication device 12 to connect with the host system 20 to retrieve any promotions information stored in host system 20 for the particular store which is to be displayed by the system. In other words, as one is driving his or her vehicle and the vehicle comes into a certain proximity to a store, for example, the 100 m range, the system would display the current promotions information. This would present the promotions information to someone actually going to that particular store concerning the current sale items, discounts or coupons or may alert someone not intending to go to the particular store of promotions that may be attractive or interesting, causing the person to enter the store. If the information consists of coupons, the person may instruct the system through display 14 to print the coupons using printer 13, or the system could be configured to automatically print coupons.

As apparent from the above discussion of the first example, the stores 2 do not need to have any equipment to take advantage of the system according to the invention. However, as shown in FIGS. 1 and 2A, a store 2 having store system 4 will provide additional features and functionality compared to that available from the first example. Store system 4 may include a receiver, transmitter or transceiver to receive and transmit information, such as the promotional information or customer identification information. Information may be sent to or received from the vehicle 1 or to host system 20.

An alternative to printing coupons would be to provide automatic promotional benefits, such as discounts, to persons identified as passengers in vehicle 1. This alternative would communicate the identification of persons who are passengers in or associated with vehicle 1 to the stores and the promotional benefit would be available to the person upon showing their identity to the store. Such identification could be based on a store's frequent shopper program, or other accounts provided to the customer. The invention could also use home telephone number, identification information returned from radio frequency interrogation of a cellular phone, social security number or equivalent indicia to identify passengers in vehicle 1.

The preferred embodiment of the invention allows the person in vehicle 1 to enter their personal identification information through a touch screen display 14. Alternative embodiments could pre-program controller 11 with identification information or allow programming through port 17.

As vehicle 1 is driven, controller 11 would notify host system 20, through wireless communications device 12, when vehicle 1, and/or it's associated passenger, enters a zone 3 in proximity to a particular store 2. The notification may be automatic using the stored identification information, or may be in response to an action of the user. The notification may be sent to host 20 which is programmed to receive and process the identification information and output the appropriate response to the vehicle. This notification may also identify the promotion 70 displayed on display 14 in order to provide the correct promotional benefit. The promotion 70 displayed will not have to be identified if the particular store is only using one promotion. Host system 20 may notify the vehicle of the frequent shopper promotion to alert the passenger(s) of the need to provide their frequent shopper identification at the associated store. There would be no need to print a coupon in this instance.

In a modification of the system just described, when a store has a store system 4, host system 20 may relay the passenger identification information and displayed promotion information to the store system 4 associated with store 2 via port 5 to allow store system 4 to automatically provide the displayed promotional benefit to the person(s) identified to be in vehicle 1. Store system 4 may even be programmed to notify the vehicle of the waiting promotional benefit through the wireless communication systems 12. The person(s) identified as being in vehicle 1 would then simply show identification to the store in order to receive the displayed promotion 70, again obviating the need for a printed coupon. Controller 11 may also create a log field to keep track of how often promotions information for a particular location is accessed, if the corresponding promotions information is displayed and for what store, if the corresponding promotions information is printed, etc. The log file may be stored in an allocated area of memory 31, or may be sent to the host system 20. Processor 11 may be programmed to periodically, for example weekly, send stored log file information to host system 20 to allow data analysis, coupon tracking, etc. In the case where the promotions information is stored at and retrieved from host system 20, the logging activities could also be performed by host system 20, exclusive of coupon printing.

The amount of promotions information which may be available to processor 10 will be determined by the memory allocated to the system. In one version of the first embodiment, processor 10 could contain minimal memory allocated to the promotions information. Memory 30 contains the lookup table having position information 60 and address information 61, and a certain amount of buffer memory allocated to hold promotions information. In this version memory 30 would be preferably a semiconductor memory. If a match is made, processor 11 would then access a remote host (system 20) using wireless communication device 12 and download any appropriate information. Virtually each time promotions information is to be displayed, it is retrieved via the wireless communication device 11 from host system 20 and stored in the buffer memory. The information would then be displayed on display 14 and could be printed through user interaction. It may also be possible to directly instruct the processor to print an appropriate coupon.

In a second version, the processor could contain a larger amount of memory and store both the lookup table and the corresponding promotions information. Memory 30 could be a magnetic or optical disk. When a match between the GPS position and a store is determined by processor 11, the corresponding promotions information is retrieved from memory 30 and displayed. In the event all of the promotions information cannot be stored in memory 30, the second version of system 10 would contact host system 20, as described above, to retrieve the promotions information. The second version reduces the amount of remote communication and associated costs of using the wireless communication systems.

Retail stores typically now advertise on a weekly basis in magazines and newspapers. The processor 11, in the first and second versions, at a given interval such as weekly, may be programmed to automatically use wireless remote communication device 12 to access host system 20 and update the lookup table (first version) and both the lookup table and the promotions data (in the second version), by downloading the (weekly) information. The wireless remote communication device 12 could also be used to update the lookup table and/or promotions data at any time desired by the advertisers. The look up table, and promotions data (in the second version), could also be updated though the use of a mass storage device connected to port 17.

The cost of such systems could be born by the advertisers. The system could then possibly be offered as a free option in the vehicle either as a stand-alone system or a system which accesses a touch screen display already installed in the vehicle. GPS position systems providing driving information are also currently available in automobiles. The system according to the invention could be easily adapted to work with the existing GPS navigation systems and displays.

Figure 4:
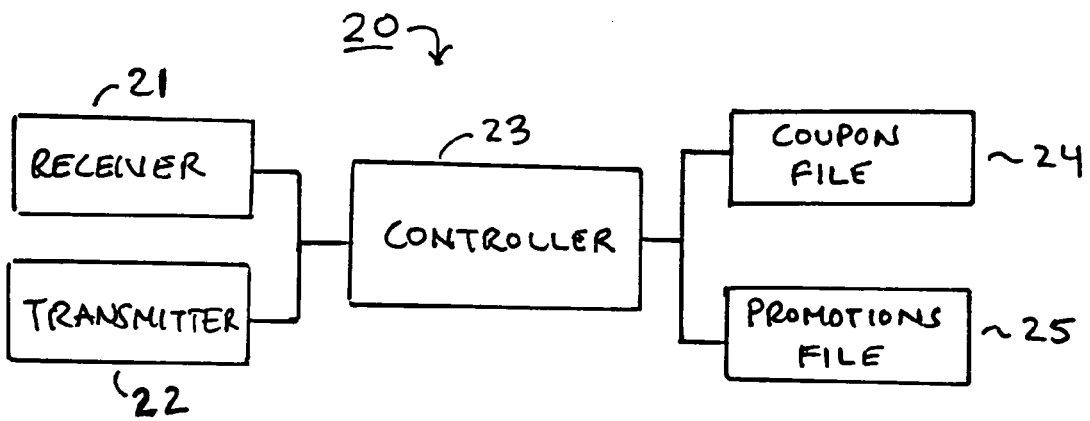
FIG. 4 is a simplified block diagram of a host system according to a first embodiment of the invention.

FIG. 4 is a simplified block diagram of the host system 20. System 20 includes a receiver 21 for connecting with and receiving information from the in-vehicle system 10 installed in the vehicle. Receiver 21 is connected to and send the information to controller 23. As discussed above, the information could be store address information 61, which was compared in a lookup table in system 10 to determine whether a match exists between the position information 60 and a store desiring to have promotions information displayed. Host system 20 compares the store address 61 to determine whether a match exists with promotions information 62. Under the control of controller 23 promotions information can be retrieved from a coupon file 24 or a promotions file 25 where data corresponding to the coupon or advertising information, such as image data, are stored. Coupon file 24 and promotions file 25 could be different memory locations in a single memory. The coupon data in file 24 and promotions data in file 25 may be mixed together and stored by store name or position.

Controller 23 then transmits the information back to the in-vehicle system 10 using transmitter 22. Transmitter 22 may be a modem connected to a cellular system or to a radio system, or could be a cellular modem or a radio modem similar to that and compatible with the modem used by system 10. Transmitter 22 and receiver 21 could also be implemented as a single transceiver device.

Host system 20 could also receive from vehicle system 10 through receiver 21 identification information associated with the person in vehicle 1, identification of which promotion is or has been displayed on display 14 and notification that vehicle 1 has entered zone 3 associated with a particular store 2, as discussed above. The entrance of vehicle 1 into a zone 3 associated with a store 2 can be used to provide automatically provide promotional benefits to the person identified in vehicle 1. Automatic promotional benefits can include the discounts advertised on the in-vehicle display 14. Controller 23 will communicate the personal identification and identify promotions displayed on the in-vehicle display to a store system 4, which will then automatically provide the promotional benefit to the identified person, as described above. The store 2 will provide the promotional benefit to the person identified in vehicle 1 for a limited time after the vehicle 1 has entered zone 3 associated with the particular store 2. The person identified as in vehicle 1 will identify himself or herself to the store to receive the promotional benefit displayed. Methods and designs of systems to automatically provide promotions to persons based upon their identity is known to practitioners in the relevant arts.

Host system 20 stores the promotions information from the retail stores. In the first version of the embodiment where the in-vehicle system 10 contains minimal information, host system 20 frequently communicates and transfers promotions information 62 residing in file 24 or file 25 to system 10. Controller 23 would then send to in-vehicle system 10 an appropriate amount of promotions information in accordance with the memory capacity of in-vehicle system 10. During such communication, the lookup table in system 10 may be updated. In the second version where the in-vehicle system 10 contains a larger amount of memory, host system 20 communicates less frequently with system 10.

In the first embodiment, in-vehicle system 10 displays the information when the vehicle enters the proximity of a particular store 2. When the vehicle enters another range of a second store, or when there is additional information to be displayed, the display 14 or indicator light 15 could be used to signal the occupants of the vehicle that additional information is waiting and the current display can be cleared or printed, then allowing the additional or new information to be displayed and/or printed as desired.

Figure 8:
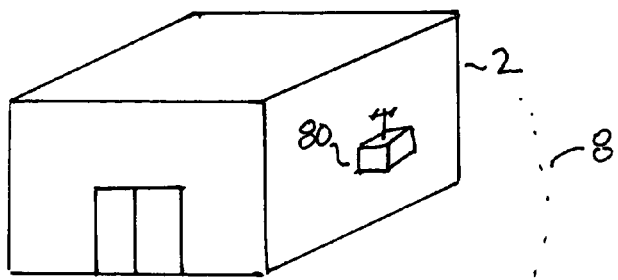
FIG. 8 is a block diagram of a second embodiment of the method and system according to the invention.
Figure 8:
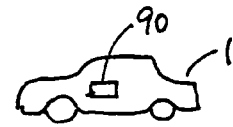
Figure 9:
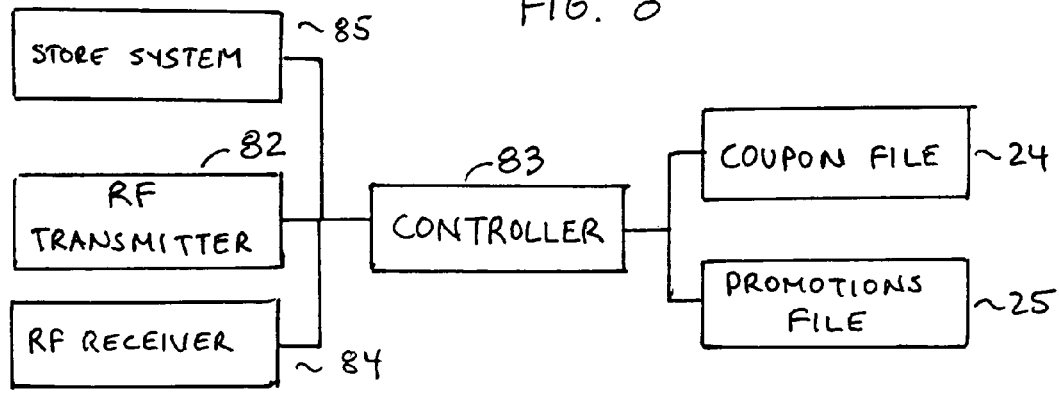
FIG. 9 is a block diagram of a the host system in the second embodiment of the system according to the invention.
Figure 10:
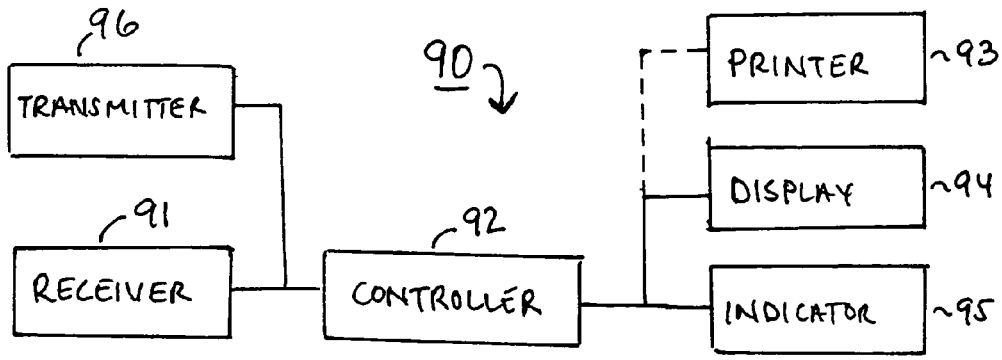
FIG. 10 is a block diagram of a second embodiment of the in-vehicle system according to the invention.

A second embodiment of the in-vehicle system uses an RF receiver, and is shown in FIGS. 8-10. In this embodiment host system 80 is installed in the store 2 and includes an RF transmitter. Host system 80 transmits a signal having a limited range 81 (shown with dashed lines), i.e., proximate to store 2. Such a range could be the same range used in the above-described GPS or Loran system. Host system 80 includes a controller 83 connected to coupon file 24 and ad file 25, which contain promotions information unique to a store 2 or a group of stores. Controller 83 controls the transfer and formatting of the promotions information to RF transmitter 82 which transmits a signal containing the promotions information. Different screens of promotions information may be transmitted together, or separately.

The RF transmission from the host 80 is received by RF receiver 91. The received signal is received by processor 92 and processed for format recognition, display and/or printing. System 90 also includes a printer 93 and display 94, and may also include an indicator 95, each functioning in the manner described above for elements 13-15, respectively. In this embodiment, since a RF system 80 transmits the promotions information, the in-vehicle system 10 requires a smaller amount of memory since only data relating to the particular store (or stores) need be received and processed.

System 90 could include an identification transmitter 96 to notify host system 80 of the entrance of vehicle 1 into the vicinity of the store 81. The identification would identify to the store the identity of the person associated with vehicle 1 and allow the store to automatically provide promotional benefits to the person associated vehicle 1, for example, in the form of a frequent shopper discount as discussed above.

The sale or advertising information from host 80 would reach customers who are both inclined to come to the store, and those proximate to the store. A person would then be able to learn of the promotions information each time he or she brings his or her vehicle into the range of the store. The customer would then not have to spend time searching for, retrieving and sifting through information to determine whether there are any specials of interest at a store where the customer inclined to go and a store in proximity to the customer.

The second embodiment could also include an RF receiver 84 in host system 80 to receive identification information or other information from vehicles 1 entering the zone. Controller 83 is connected to a store system 85 and provides the identification information to store system 85.

Figure 6D:
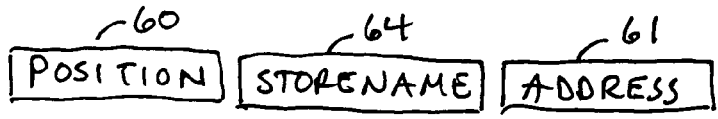

In an third embodiment of the system according to the invention, the in-vehicle system of the first embodiment contains customizable features. System 10 contains a lookup table in memory 30 containing store location information. This information could be expanded to include store names field 64 shown in FIG. 6D. Processor 11 may search the information in the lookup table by both position and store name.

Display 14 is also modified to contain command areas allowing the user to access promotions information by location (such as ZIP code, or street address) or by store name. Processor 11 receives the information request from the display and searches the lookup table for a match. In the case of the GPS-based and Loran-based systems in the first embodiment, the ZIP code or street address can be converted by processor 11 to a range of GPS values of Loran values. The store or stores meeting the input parameters are displayed on display 14. The customer selects the particular stores of interest and the in-vehicle system 10 displays the corresponding promotions information retrieved via the wireless remote communication device 12 from host 20 (first version) or retrieved from memory 30 (second version). In this embodiment a customer would not only be able to receive information due to the proximity of the vehicle to the various stores subscribing to the system, but could also display those which are of interest in the area or also display the information from stores in a larger area subscribing to the system.

Obviously, numerous modifications and variations of the present invention are possible in light of the above teachings. For example, while the embodiments above show both a receiver and a transmitter for receiving and transmitting information, a transceiver may be used instead. While the invention has been described as having one of a GPS, Loran or local receivers, the system according to the invention may include two or all three of the receivers. Also, various data formats conforming to the needs of the store subscribers or to system constraints may be used. The store system may also contain various storage devices and I/O devices to store and process the various information desired by the subscribers, or needed by system requirements. Also any needed information may be remotely supplied to the store systems. It is therefore to be understood that within the scope of the appended claims, the invention may be practiced otherwise than as specifically described herein.

What is claimed as new and desired to be protected by Letters Patent is:

1. An in-vehicle promotions system installed in a vehicle, comprising:
   a position receiver configured to provide automatically detected position data for said vehicle thereby monitoring a position of said vehicle in relation to a commercial entity;
   a controller connected to said receiver;
   a wireless communications device connected to said controller and configured to transmit identity information identifying a person associated with said vehicle and to receive promotional information targeted for said person based on a purchase history of said person; and
   an interior display configured to be installed in an interior of said vehicle and connected to said controller,
   wherein said controller automatically outputs said promotional information to said interior display based on said position data indicating that said vehicle is in a predetermined position in relation to said commercial entity.

2. A system as recited in claim 1, comprising a printer connected to said controller.

3. A system as recited in claim 1, wherein said receiver comprises one of a GPS receiver and a Loran receiver.

4. A system as recited in claim 1, wherein said wireless communications device comprises one of a radio modem, a cellular modem and paging transceiver.

5. A system as recited in claim 1, comprising:
   a memory connected to said controller having a lookup table linking a position of said vehicle with a storage location of promotions information.

6. A system as recited in claim 5, comprising:
   means for updating said memory.

7. A system as recited in claim 5, wherein:
   said memory comprises a promotions information storage area.

8. A system as recited in claim 1, wherein:
   said display comprises touch command areas for controlling display and printing of promotions information displayed on said display.

9. A system as recited in claim 1, comprising:
   means for storing information linking a zone with promotions information; and
   said controller retrieving said promotions information associated with said zone based upon said vehicle entering said zone.

10. A system as recited in claim 9, comprising:
    means for storing information linking a zone proximate to a store with promotions information associated with said store.

11. A system as recited in claim 9, comprising:
    said controller displaying said promotions information associated with said zone only after said vehicle enters said zone.

12. A system as recited in claim 1, comprising:
    means for storing information linking promotions information with a business entity; and
    said controller retrieving said promotions information associated with said business entity based upon a user request for information related to said business entity.

13. A system as recited in claim 1, comprising:
    means for storing information linking a zone with promotions information; and
    said controller retrieving said promotions information associated with said zone based upon a user request for information related to said business entity.

14. A system as recited in claim 1, wherein
    said promotions information including coupon information.

15. A system as recited in claim 14, wherein said display includes means for activating printing of a coupon information using said printer.

16. A system as recited in claim 1, wherein said controller comprises means for logging activity related to display of said promotions information.

17. A system as recited in claim 1, further comprising a store system wirelessly linked with said wireless communications device, said store system comprising:
    a second wireless communications device;
    a store controller connected to said second wireless communications device; and
    said store controller providing automatic promotional benefits to said vehicle.

18. A system as recited in claim 17, wherein said controller is further adapted to communicate to said store controller an indication of promotion displayed on said display.

19. A system as recited in claim 1, further comprising a host system wirelessly linked with said wireless communications device, said host system comprising:
    a second controller;
    a second wireless communications device connected to said second controller; and
    a promotions information storage device connected to said second controller.

20. A system as recited in claim 19, wherein:
    said receiver is adapted to output a position of said vehicle to said controller;
    said controller comprises means for retrieving promotions information from said host system based upon said position.

21. A system as recited in claim 19, comprising:
a memory connected to said controller storing information linking position and a storage location of corresponding promotions information;
said controller comprises means for automatically retrieving from said host system updated information linking said position and said location of corresponding promotions information.

22. A system as recited in claim 19, further comprising a store controller in communication with said second controller and wherein said store controller provides automatic promotional benefits to said vehicle.

23. A system as recited in claim 22, wherein said controller further communicates to said store controller an indication of promotion displayed on said display.

24. A system as recited in claim 1, comprising:
means for storing at least one of position data corresponding to a position of a store with which promotions data is associated and identification data identifying said store;
said display including means for displaying said data based upon at least one said position data and said identification data.

25. A system as recited in claim 24, comprising:
means for retrieving said promotions data based upon at least one of said position data and said identification data.

26. An in-vehicle promotions system installed in a vehicle, comprising:
an RF transmitter configured to transmit identity information identifying a person associated with said vehicle;
an RF receiver configured to receive transmitted promotions information targeted for said person based on a purchase history of said person;
a controller connected to said receiver;
a device configured to monitor a position of said vehicle in relation to a commercial entity; and
an interior display configured to be installed in an interior of said vehicle and connected to said controller wherein said controller causes said promotions information to be automatically displayed on said interior display based on an automatically detected position of said vehicle which indicates that the vehicle is in a predetermined position with respect to the commercial entity.

27. A system as recited in claim 26, comprising a printer connected to said controller.

28. A system as recited in claim 26, wherein:
said display comprises touch command areas for controlling display and printing of said promotions information displayed on said display.

29. A system as recited in claim 26, wherein:
said display displays said promotions information including coupon information.

30. A system as recited in claim 29, wherein said display includes means for activating printing of said coupon information using said printer.

31. A system as recited in claim 26, further comprising a host system which comprises:
a second controller;
an RF transmitter for transmitting said promotions information to said RF receiver; and
a promotions information storage device connected to said second controller.

32. A system as recited in claim 31, comprising:
means for updating said storage device.

33. A system as recited in claim 26, wherein:
said RF transmitter is located in a store;
said RF transmitter has a transmitting range proximate to said store.

34. A system as recited in claim 33, comprising:
said RF receiver receiving said promotions information upon said vehicle position being within said range.

35. A system as recited in claim 26, wherein:
said promotions information is displayed in response to information provided by a user request.

36. A system as recited in claim 26, further comprising;
a wireless communications device installed in said vehicle and connected to said controller;
a store system wirelessly linked with said wireless communications device.

37. A system as recited in claim 36, wherein said store system comprises:
a second wireless controller; and
a store controller which provides automatic promotional benefits to said vehicle.

38. A system as recited in claim 37, wherein said controller further communicates to said store controller an indication of promotion displayed on said display.

39. A method of displaying promotions information to a vehicle occupant, comprising:
transmitting identifying information identifying a person associated with said vehicle;
storing data corresponding to promotions information targeted for said person based on a purchase history of said person in said vehicle;
monitoring a position of said vehicle in relation to a store with which the promotions information is associated; and
automatically displaying said data on an interior display after it is automatically detected by said monitoring step that said vehicle comes within a defined proximity to the store with which said promotions information is associated.

40. A method as recited in claim 39, comprising:
updating said data.

41. A method as recited in claim 39, comprising:
storing data linking a position of said vehicle with said promotions information;
monitoring said position of said vehicle; and
displaying said data corresponding to said promotions information using said data linking said position and said promotions information after said position of said vehicle is within said defined proximity to said store.

42. A method as recited in claim 39, comprising:
printing said data in said vehicle.

43. A method as recited in claim 39, comprising:
said data including coupon information.

44. A method as recited in claim 39, further comprising printing said coupon information in said vehicle.

45. A method as recited in claim 39, comprising:
defining a zone proximate to said store;
determining a position of said vehicle;
comparing said position with said zone; and
determining whether to display said data based upon said comparison.

46. A method as recited in claim 39, comprising:
monitoring a position of said vehicle using one of a GPS system and a Loran system.

47. A method as recited in claim 39, comprising:
transmitting said data from store, and
receiving said data in said vehicle.

48. A method as recited in claim 39, comprising:
providing to said person an automatic promotional benefit corresponding to said data.

49. A method as recited in claim 39, comprising:
transmitting said data from a host system; and
receiving said data in said vehicle.

50. A method as recited in claim 49, comprising:
using said data stored in said vehicle for a predetermined period of time; and
updating said data with updated data transmitted from said host.

51. A method as recited in claim 50, comprising:
automatically updating said data with said updated data.

52. A method as recited in claim 39, comprising:
storing at least one of position data relating to a position of said store and identification data identifying said store;
displaying said data corresponding to said promotions information based upon at least one of said position data and said identification data.

53. A method as recited in claim 52, comprising:
retrieving said data corresponding to said promotions information based upon at least one of said position data and said identification data.

54. A method of distributing promotions information, comprising:
forming a database of promotions information of at least one store;
communicating to said store identifying information identifying a person associated with said vehicles;
wirelessly distributing data corresponding to promotions information, targeted for said person based on a purchase history of said person, to a vehicle;
monitoring a position of said vehicle in relation to a store; and
automatically displaying on an interior display said data to occupants of said vehicle after it is automatically detected by said monitoring step that said vehicle comes within a defined range of said store.

55. A method as recited in claim 54, comprising:
displaying said data only after said vehicle comes within a defined range of said store.

56. A method as recited in claim 54, comprising:
printing said data corresponding to said promotions information.

57. A method as recited in claim 56, wherein said data comprises coupon data.

58. An in-vehicle promotions system installed in a vehicle, comprising:
a position receiver configured to monitor a position of said vehicle in relation to a commercial entity having a predetermined proximity zone assigned thereto;
a wireless communications device configured to receive promotional information from said commercial entity; and
a controller coupled to said position receiver and said wireless communications device and configured to process said promotional information for display when said controller determines that said vehicle is within the predetermined proximity zone assigned to said commercial entity; and
an interior display configured to be installed in an interior of said vehicle and connected to said controller, said interior display configured to display said promotional information.

59. The system of claim 58, wherein:
said position receiver comprises a first receiver dedicated to monitoring a position of said vehicle, and
said wireless communications device comprises a second receiver dedicated to receiving said promotional information from the commercial entity.

60. The system of claim 59, wherein said first receiver comprises at least one of a GPS or a LORAN receiver.

61. The system of claim 59, wherein said second receiver comprises an RF receiver.

62. The system of claim 59, further comprising a memory storing a lookup table of data identifying the commercial entity in association with data defining said predetermined proximity zone, wherein said controller is configured to:
monitor said first receiver to determine a position of said vehicle, and
compare said position of said vehicle to said lookup table to determine that said vehicle is within the predetermined proximity zone assigned to said commercial entity.

63. The system of claim 58, wherein said position receiver and said wireless communications device comprise a single receiver configured to receive said promotions through a wireless signal from said commercial entity, said wireless signal having a limited transmission range corresponding to said predetermined proximity zone assigned to said commercial entity.

64. The system of claim 62, wherein said single receiver comprises an RE receiver.

65. The system of claim 63, wherein said controller determines that said vehicle is within the predetermined proximity zone assigned to said commercial entity by monitoring said single receiver to determine if said wireless signal having a limited range has been received by said single receiver.

66. The system of claim 58, wherein
said predetermined proximity zone assigned to a commercial entity comprises a zone corresponding to a parking lot of the commercial entity, and
said controller is configured to process said promotional information for display when said controller determines that said vehicle is within the parking lot.

* * * * *

UNITED STATES PATENT AND TRADEMARK OFFICE
CERTIFICATE OF CORRECTION

| | | |
|---|---|---|
| PATENT NO. | : 7,426,480 B2 | |
| APPLICATION NO. | : 09/373625 | |
| DATED | : September 16, 2008 | |
| INVENTOR(S) | : Granger et al. | |

It is certified that error appears in the above-identified patent and that said Letters Patent is hereby corrected as shown below:

Column 12, please replace lines 31-33 now reading:

"14. A system as recited in claim 1, wherein
said promotions information including coupon information."

with the following:

--14. A system as recited in claim 1, wherein
the promotions information includes coupon information.--

Column 12, please replace lines 37-39 now reading:

"16. A system as recited in claim 1, wherein said controller comprises means for logging activity related to display of said promotions information."

with the following:

--16. A system as recited in claim 1, wherein said controller comprises means for logging activity related to display of the promotions information.--

Column 16, please replace lines 37-38 now reading:

"64. The system of claim 62, wherein said single receiver comprises an RE receiver."

with the following:

UNITED STATES PATENT AND TRADEMARK OFFICE
CERTIFICATE OF CORRECTION

PATENT NO. : 7,426,480 B2
APPLICATION NO. : 09/373625
DATED : September 16, 2008
INVENTOR(S) : Granger et al.

It is certified that error appears in the above-identified patent and that said Letters Patent is hereby corrected as shown below:

--64. The system of claim 62, wherein said single receiver comprises an RF receiver.--

Signed and Sealed this

Twenty-eighth Day of October, 2008

JON W. DUDAS
*Director of the United States Patent and Trademark Office*